(12) United States Patent
Valerio, Jr. et al.

(10) Patent No.: US 7,674,000 B2
(45) Date of Patent: Mar. 9, 2010

(54) BACKLIGHT FOR A DISPLAY DEVICE WITH IMPROVED FILTERING AND METHOD FOR CONSTRUCTING THE SAME

(75) Inventors: Robert O. Valerio, Jr., Albuquerque, NM (US); Michael R. Praiswater, Albuquerque, NM (US); Daniel E. Hadlich, Albuquerque, NM (US)

(73) Assignee: Honeywell International, Inc., Morristown, NJ (US)

( * ) Notice: Subject to any disclaimer, the term of this patent is extended or adjusted under 35 U.S.C. 154(b) by 148 days.

(21) Appl. No.: 11/742,248

(22) Filed: Apr. 30, 2007

(65) Prior Publication Data

US 2008/0266852 A1    Oct. 30, 2008

(51) Int. Cl.
*G09F 13/04* (2006.01)
*G09F 13/08* (2006.01)
*B60Q 1/00* (2006.01)
*F21V 15/04* (2006.01)

(52) U.S. Cl. .................. 362/97.3; 362/369; 362/390
(58) Field of Classification Search ............... 362/390, 362/97, 97.3, 368, 369
See application file for complete search history.

(56) References Cited

U.S. PATENT DOCUMENTS

| | | | | |
|---|---|---|---|---|
| 4,967,328 | A * | 10/1990 | Tatavoosian | 362/267 |
| 5,722,767 | A * | 3/1998 | Lin | 362/249 |
| 6,565,239 | B2 * | 5/2003 | Rizkin et al. | 362/373 |
| 6,789,921 | B1 * | 9/2004 | Deloy et al. | 362/97.3 |
| 7,134,769 | B2 * | 11/2006 | Rohlfing et al. | 362/331 |
| 7,374,306 | B2 * | 5/2008 | Liu | 362/27 |
| 2006/0098458 | A1 * | 5/2006 | Mikami | 362/632 |

FOREIGN PATENT DOCUMENTS

| | | |
|---|---|---|
| EP | 0893727 A1 | 1/1999 |
| FR | 2802009 | 6/2001 |
| WO | 02060224 A1 | 8/2002 |
| WO | 2005043230 A1 | 5/2005 |

OTHER PUBLICATIONS

European Search Report dated Aug. 18, 2008.

* cited by examiner

*Primary Examiner*—Jacob Y Choi
*Assistant Examiner*—David J Makiya
(74) *Attorney, Agent, or Firm*—Ingrassia Fisher & Lorenz, P.C.

(57) ABSTRACT

A light source and a method for constructing a light source for a display device are provided. A first member having first and second sides and an opening therethrough is provided. A seal is positioned on the first side of the first member and on at least one side of the opening, the seal having a first thickness. A second member is positioned on the first side of the first member such that the seal is between the first and second members. A light emitting diode (LED) operable to emit light is positioned at least one of partially between the first and second members and partially within the opening. The first member is secured relative to the second member causing a force to be applied to the seal such that the thickness of the seal is reduced to a second thickness and substantially no light can propagate between the seal and the first and second members.

18 Claims, 17 Drawing Sheets

BACKLIGHT FOR A DISPLAY DEVICE WITH IMPROVED FILTERING AND METHOD FOR CONSTRUCTING THE SAME

TECHNICAL FIELD

The present invention generally relates to display devices, and more particularly relates to a backlight for a display device with improved filtering and a method for constructing such a backlight.

BACKGROUND

In recent years, liquid crystal displays (LCDs), and other flat panel display devices, have become increasingly popular as mechanisms for displaying information to operators of vehicles, such as aircraft. One of the reasons for this is that LCDs are capable of providing very bright and clear images that are easily seen by the user, even in high ambient light situations, such as daytime flight.

One of the most important features in an avionic system is the integration of Night Vision Imaging Systems (NVIS) which gives the user the ability to observe the environment outside the aircraft in very low ambient light situations, such as nighttime flight, typically using a NVIS headset or goggles. The NVIS systems operate by being particularly sensitive to certain frequencies of light, such as infrared and/or near-infrared. Thus, any objects emitting such frequencies will appear to be relatively bright to the user.

In order to prevent infrared light emitted by the LCDs from seeming overly bright to a user employing an NVIS headset or goggles, the LCDs, or the LCD light sources, are often provided with optical filters that filter or block the particular frequencies of light to which the NVIS systems are sensitive. However, often the construction of the flat panel display devices does not provide for a structure that will maximize filtering performance, particularly in flat panel display systems that can operate in both a "daytime mode" and a "nighttime mode."

Accordingly, it is desirable to provide a method for constructing a backlight for a flat panel display system that maximizes the optical filtering performance thereof. Additionally, is it desirable to provide a backlight for a flat panel display system with improved optical filtering performance. Furthermore, other desirable features and characteristics of the present invention will become apparent from the subsequent detailed description and the appended claims, taken in conjunction with the accompanying drawings and the foregoing technical field and background.

BRIEF SUMMARY

A method for constructing a light source for a display device is provided. A first member having first and second sides and an opening therethrough is provided. A seal with a first thickness is positioned on the first side of the first member and on at least one side of the opening. A second member is positioned on the first side of the first member such that the seal is between the first and second members. A light emitting diode (LED) operable to emit light is positioned at least one of partially between the first and second members and partially within the opening. The first member is secured relative to the second member causing a force to be applied to the seal such that the thickness of the seal is reduced to a second thickness and substantially no light can propagate between the seal and the first and second members.

A method for constructing a backlight for a display device is provided. A printed circuit board (PCB) having a plurality of LEDs attached to a first side thereof is provided. A plurality of sealing members having first and second portions are positioned on the first side of the PCB and on opposing sides of at least one of the LEDs. A frame having first and second sides and a plurality of openings therethrough is provided. The PCB is secured relative to the frame such that the sealing members are positioned between the PCB and the frame and each of the plurality of LEDs is at least partially positioned within one of the openings. The securing of the frame causes a force to be applied to the sealing members by the PCB and the frame such that the thickness of the sealing members is reduced to a second thickness and substantially no light can propagate between the sealing members and the frame and between the sealing members and the PCB.

A backlight for a display device is provided. The backlight includes a frame having a plurality of openings therethrough, a PCB having a plurality of LEDs attached thereto and secured relative to the PCB such that each of the LEDs is at least partially positioned within one of the plurality of openings, and a plurality of sealing members having first and second portions positioned between the frame and the PCB with the first and second portions of each of the sealing members being on opposing sides of one of the openings and one of the LEDs and a force being applied to the sealing members by the frame and the PCB such that substantially no light can propagate between the sealing members and the frame and between the sealing members and the PCB.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-9 are merely illustrative and may not be drawn to scale.

FIG. 1 to FIG. 9 illustrate a backlight for a flat panel display system and a method for constructing such a backlight and system. A printed circuit board (PCB) is provided. The PCB has a plurality of LEDs attached to a first side thereof. A plurality of sealing members having first and second portions is positioned on the first side of the PCB and on opposing sides of at least one of the LEDs. A frame (or first member) having first and second sides and a plurality of openings therethrough is provided. The PCB (or second member) is secured relative to the frame such that the sealing members are positioned between the PCB and the frame and each of the plurality of LEDs is at least partially positioned within one of the openings. The securing of the frame causes a force to be applied to the sealing members by the PCB and the frame such that the thickness of the sealing members is reduced to a second thickness and substantially no light can propagate between the sealing members and the frame and between the sealing members and the PCB. In one embodiment, the sealing members are in direct contact with the PCB and the frame, as no adhesive is used to secure the sealing members.

Optical filters may be positioned over the openings on a side of the frame opposing the LEDs to filter selected frequencies of light emitted from the LEDs. To prevent unfiltered light from propagating between the optical filters and the frame, an adhesive opaque to the selected frequencies may be deposited between the optical filters and the frame.

Figure 1:
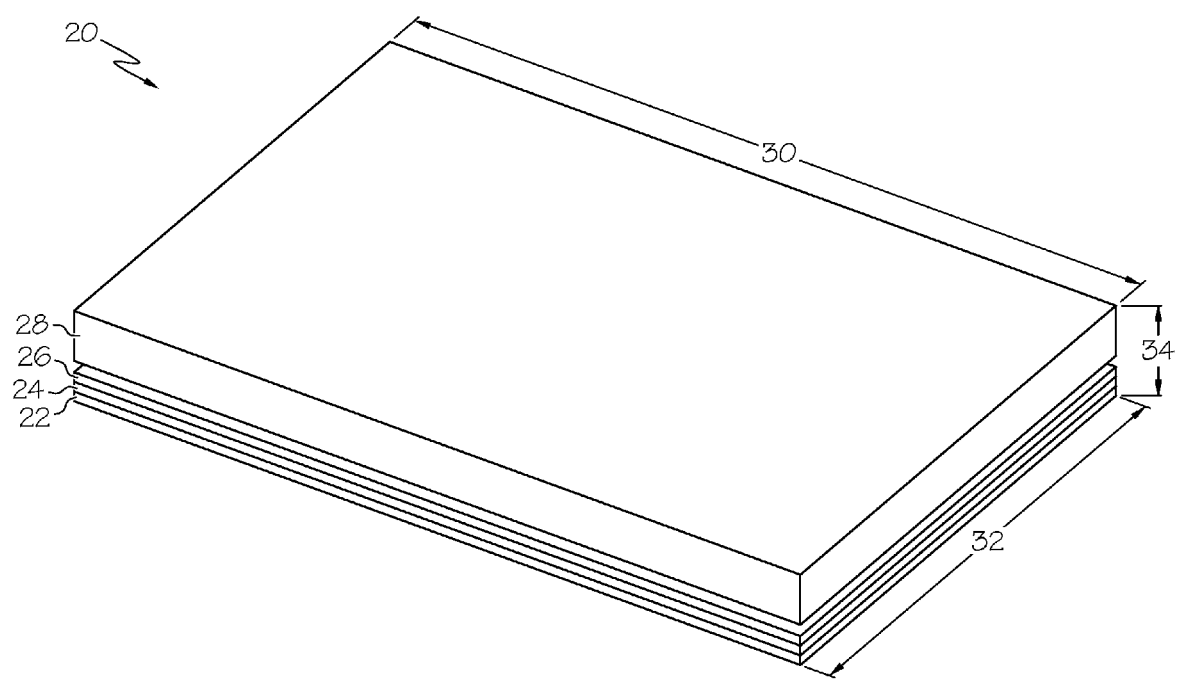
FIG. 1 is an isometric view of a flat panel display system, according to one embodiment of the present invention.

FIG. 1 illustrates a flat panel display system 20, according to one embodiment of the present invention. As will be described in greater detail below, in conjunction with subsequent drawings, the flat panel display system 20 includes a printed circuit board (PCB) 22, a frame 24, a reflective layer 26, and a liquid crystal display (LCD) panel 28. The PCB 22, the frame 24, and the reflective layer 26 may jointly form a flat panel display system light source of backlight. Each of the components of the flat panel display system 20 shown in FIG. 1 have, for example, a length 30 (dictated by the length of the LCD viewable area) and a width 32 (dictated by the width of the LCD viewable area), while the flat panel display system 20 has an overall thickness 34 of, for example, between 1 and 4 inches. FIGS. 2-15 illustrate the components of the flat panel display system 20 shown in FIG. 1 in greater detail and a method for constructing the flat panel display system 20, along with the flat panel display system light source or backlight.

Figure 2:
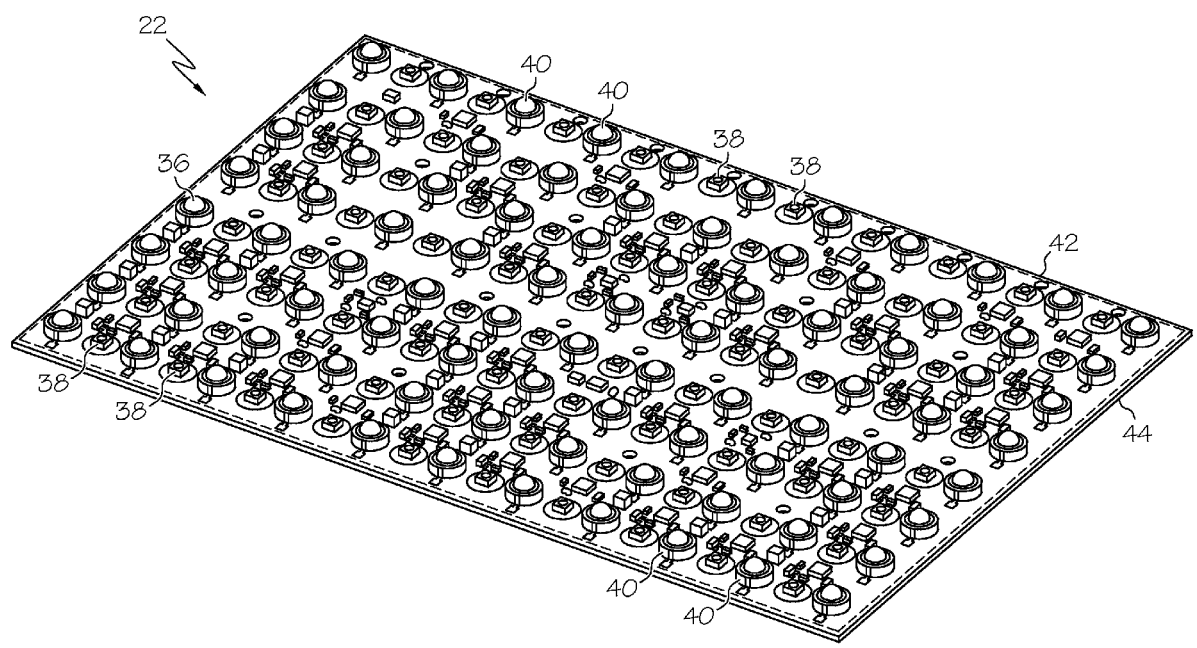
FIG. 2 is an isometric view of a printed circuit board (PCB), including a plurality of LEDs, within the flat panel display system of FIG. 1.
Figure 3:
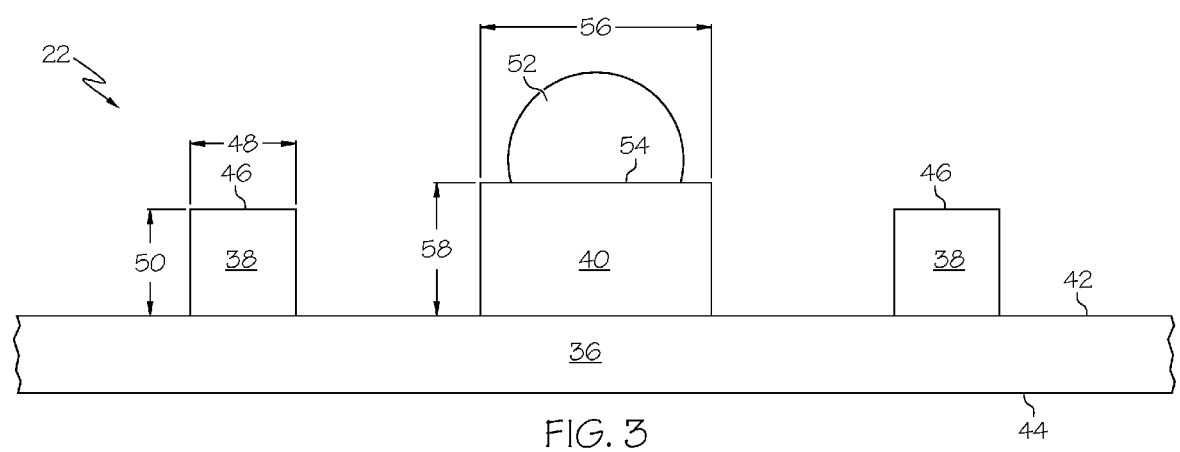
FIG. 3 is a cross-sectional side view of a portion of the PCB of FIG. 2.

FIGS. 2 and 3 illustrate the PCB, or printed wiring board (PWB), 22. The PCB 22 includes a substrate 36 (or second member), a first set (or first) LEDs 38, and a second set (or second) LEDs 40. The substrate 36 is, in one embodiment, made of a molded glass epoxy resin and has an upper surface (or first side) 42 and a lower surface (or second side) 44. The first and second sets of LEDs 38 and 40 are attached to the upper surface and arranged in a plurality of alternating rows, each having eight LEDs 38 and 40 and extending in a direction parallel with a direction in which the width 32 of the flat panel display 20 extends (as shown in FIG. 1). In the depicted embodiment, the first set of LEDs 38 includes ten rows, and the second set of LEDs 40 includes 11 rows. Although not shown in detail, the PCB 22 also includes multiple conductive traces on the substrate 36 interconnecting the LEDs 38 and 40, as well as various other circuitry electrically coupled to the LEDs 38 and 40.

Still referring to FIG. 3, in one embodiment, as described below, the first LEDs 38 are relatively low power LEDs that are used to illuminate the LCD panel 28 (FIG. 1) during nighttime operation. Although not shown in detail, the first LEDs 38 include a lens adjacent to a top side 46 thereof through which light is directed and have a width 48 and a height 50. The second LEDs 40 are relatively high power LEDs that are used to illuminate the LCD panel 28 during daytime operation. The second LEDs 40 include a lens 52 protruding from a top side 54 thereof and have a width 56 and a height 58 (as measured between the top surface 42 of the substrate 36 and the top side 54 of the second LEDs 54). In the depicted embodiment, the width 48 and height 50 of the first LEDs 38 are less than the respective width 56 and height 58 of the second LEDs 40 (i.e., the first LEDs 38 are smaller than the second LEDs 40).

Figure 4:
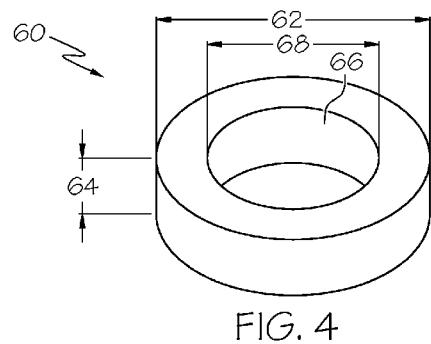
FIG. 4 is an isometric view of a gasket.

FIG. 4 illustrates a gasket (or seal or sealing member) 60 which is utilized in one embodiment of the present invention. The gasket 60 is an annular or ring-shaped body with an outer diameter 62, an uncompressed height (i.e., a first height) 64, and a gasket (or sealing member) opening 66 therethrough that has an inner diameter 68. In one embodiment, the gasket 60 is made of a rubber and/or foam material that is at least partially compressible, as is described in greater detail below.

Figure 5:
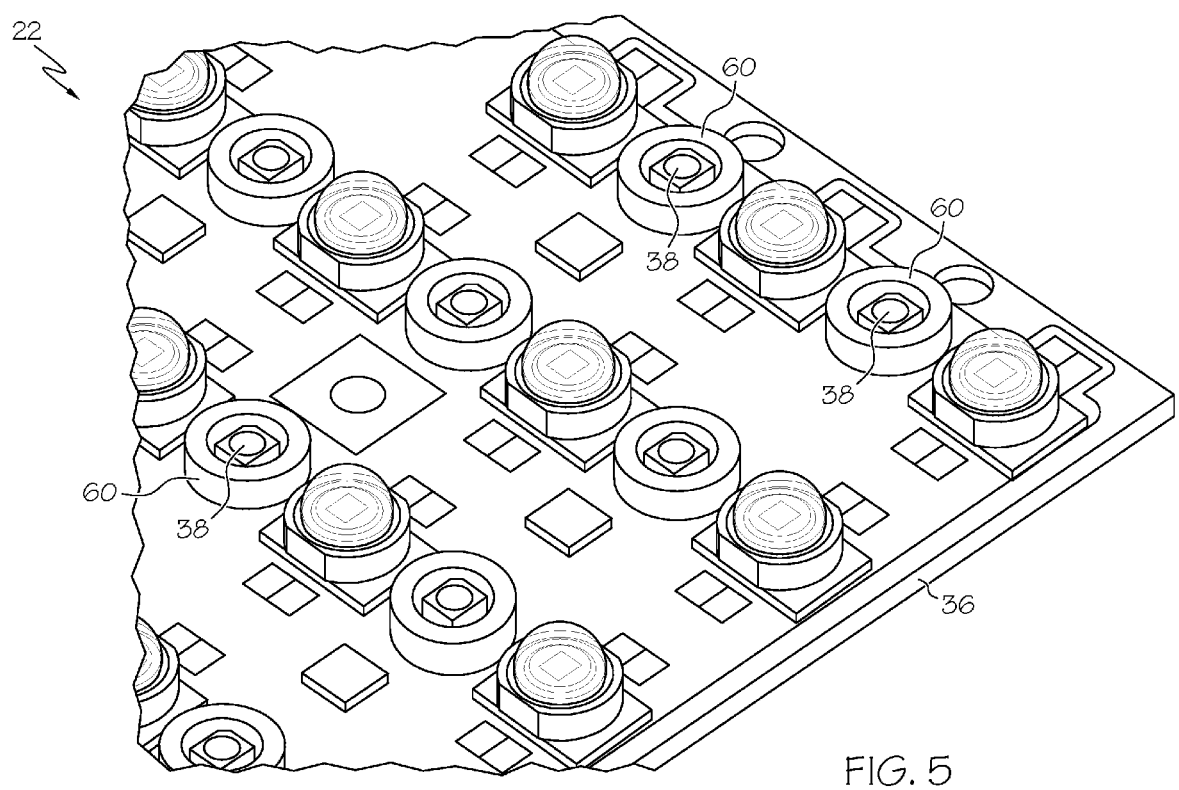
FIG. 5 is an isometric view of a portion of the PCB of FIG. 2 with a plurality of the gaskets of FIG. 4 positioned thereon.
Figure 6:
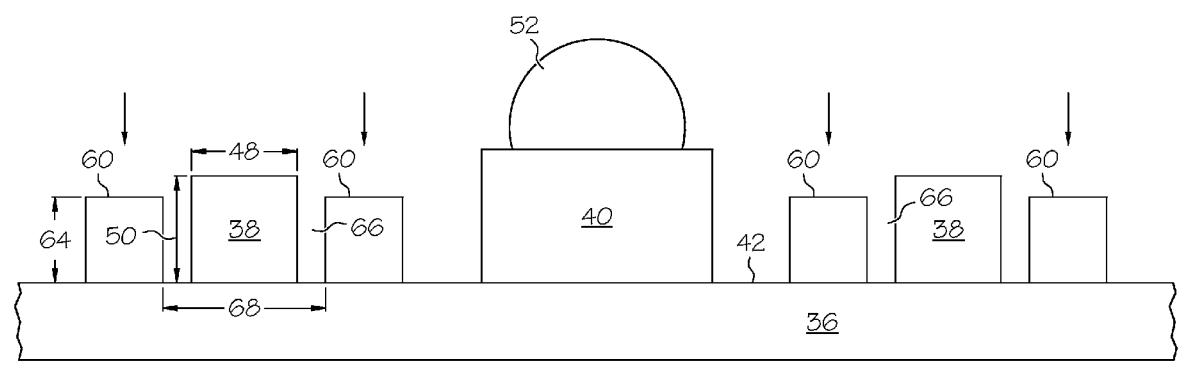
FIG. 6 is a cross-sectional side view of the PCB of FIG. 5.

Referring to FIGS. 5 and 6, a plurality of the gaskets 60 are placed on the PCB substrate 36 such that each gasket 60 surrounds a respective one of the first LEDs 38. More particularly, referring specifically to FIG. 6, the gaskets 60 are placed on the upper surface 42 of the substrate 36 such that the first LEDs 38 extend upwards through the gasket openings 66 of the gaskets 60. In the depicted embodiment, the first LEDs 38 and the gaskets 60 are sized and shaped such that the width 48 of the first LEDs is less than the diameter 68 of the gasket openings 66 and the height 50 of the first LEDs 50 is less than or equal the free standing height 64 of the gaskets 60. It should be noted that, in at least one embodiment, the gaskets 60 are placed in direct contact with the upper surface 42 of the substrate 36 of the PCB 22. More particularly, no adhesive material is deposited between the gaskets 60 and the substrate 36.

Figure 7:
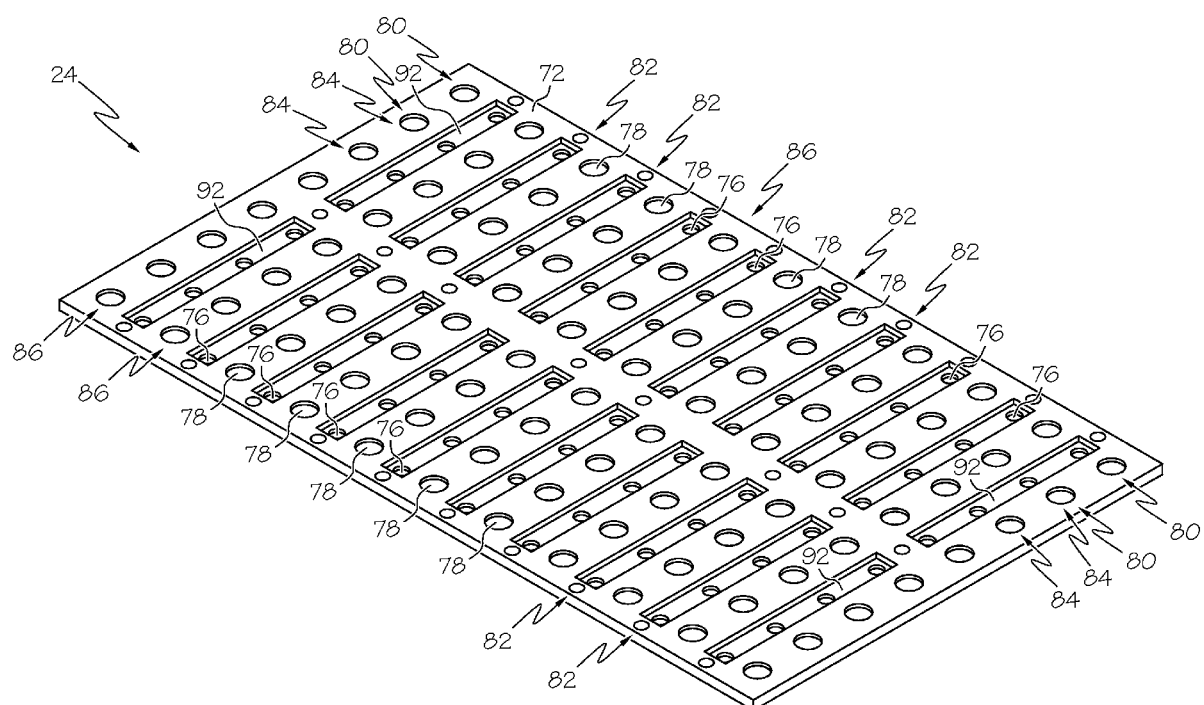
FIG. 7 is an isometric view of a top side of a backlight frame within the flat panel display system of FIG. 1.
Figure 8:
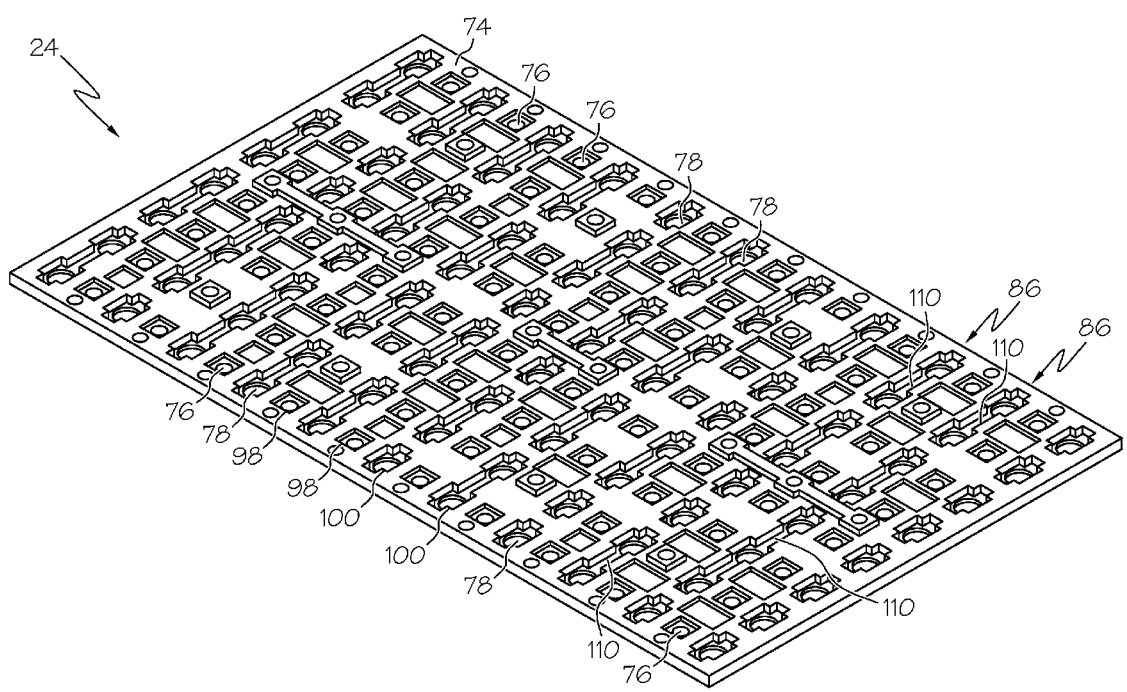
FIG. 8 is an isometric view of a bottom side of the backlight frame of FIG. 7.
Figure 9:
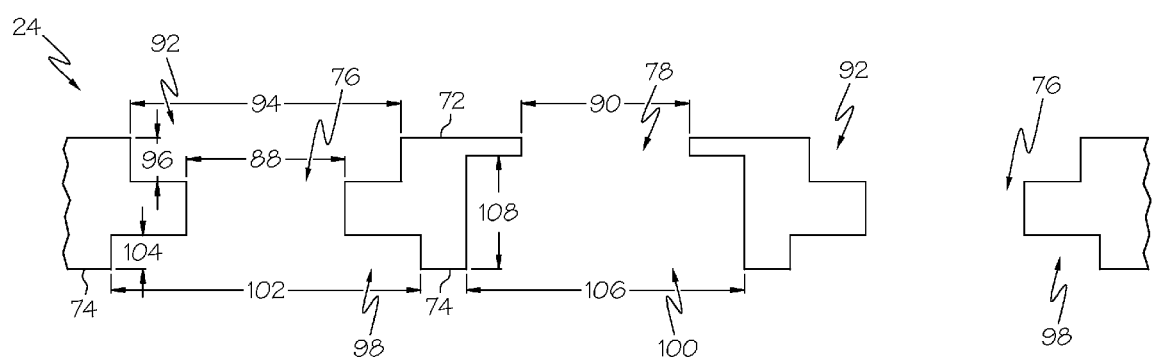
FIG. 9 is a cross-sectional side view of a portion of the backlight frame of FIG. 7.

FIGS. 7, 8, and 9 illustrate the frame 24, or backlight frame (or first member), according to one embodiment of the present invention, with FIG. 7 being an isometric view of a top side 72 of the frame 24, FIG. 8 being a isometric view of a bottom side 74 of the frame 24, and FIG. 9 being a cross-sectional side view of a portion of the frame 24. As shown in FIGS. 7 and 8, the frame 24 includes a first set of LED openings (or first LED openings) 76 and a second set of LED openings (or second LED openings) 78 extending therethrough. In the example shown, referring specifically to FIG.

7, the first LED openings 76 are arranged in an 8×10 array (i.e., eight rows 80 and ten columns 82), and the second LED openings 78 are arranged in an 8×11 array (i.e., eight rows 84 and eleven columns 86). As shown, each of the columns 82 of the first LED openings 76 are positioned between two columns 86 of the second LED openings 78, while the rows 80 and 84 of the first and second LED openings 76 and 78 are congruent (i.e., the rows contain both first and second LED openings 76 and 78). As shown in FIG. 9, the first LED openings 76 have a width (or diameter) 88, and the second LED openings 78 have a width (or diameter) 90 that is greater than the width 88 of the first LED openings 76.

Referring now to FIGS. 7 and 9, the top side 72 of the frame 24 also includes a plurality of optical filter cavities 92 around the first LED openings 76. The optical filter cavities 92 are, in the depicted embodiment, rectangular depressions or grooves formed in the top side 72 of the frame 24 in which the first LED openings 76 are positioned. In the depicted embodiment, the optical filter cavities 92 are arranged in a 2×10 array such that two of the optical filter cavities 92 occupy each column 82 of the first LED openings 76, with four of the first LED openings 76 in each row 82 being within each of the optical filter cavities 92. As such, although not shown, the optical filter cavities 92 have a length that is slightly less than half the width of the flat panel display system 20 (shown in FIG. 1). As shown in FIG. 9, the optical filter cavities 92 have a width 94 that is greater than the width 88 of the first LED openings 76 and a depth 96, as measured from the top side 72 of the frame 24.

As illustrated in FIG. 8 in combination with FIG. 9, the bottom side 74 of the frame 24 includes a plurality of gasket (or sealing member) cavities 98 and a plurality of second LED cavities 100. In the depicted embodiment, the gasket cavities 98 are substantially square and positioned about a respective one of the first LED openings 76 on the bottom side 74 of the frame 24. The gasket cavities 98 have a width 102 that is greater than the width 88 of the first LED openings 76 and the width 94 of the optical filter cavities 92 and a depth 104, as measured from the bottom side 74 of the frame 24. The second LED cavities 100 have a width 106 that is greater than the width 90 of the second LED openings 78 and a depth 108, as measured from the bottom side 74 of the frame 24. As shown specifically in FIG. 8, the bottom side 74 of the frame 24 also includes LED circuitry trenches 110 that interconnect selected pairs of the second LED cavities 100 within the columns 86 of the second LED openings 78. It should be understood that the trenches may or may not be required depending on the existence of additional circuitry besides the LEDs 38 and 40.

Figure 10:
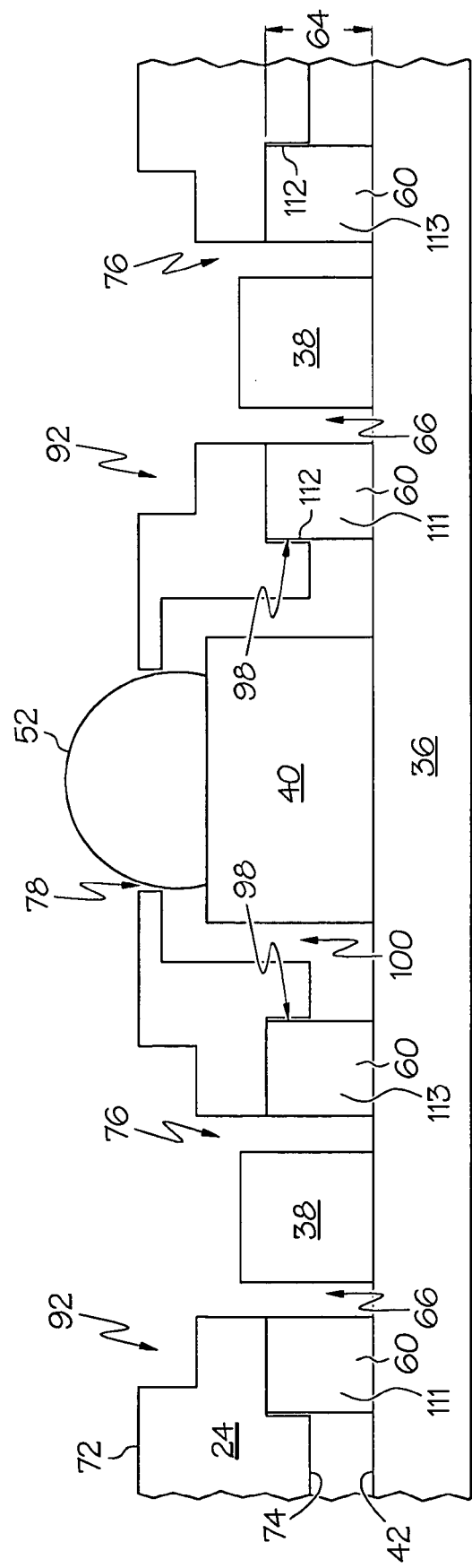
FIG. 10 is a cross-sectional side view of the backlight frame of FIG. 9 being positioned above the PCB of FIG. 6.

Referring to FIG. 10, the frame 24 is placed over substrate 36 with the bottom side 74 thereof facing the upper surface 42 of the substrate 36. As shown, the placement of the frame 24 causes the gaskets 60 to be inserted into the gaskets cavities 98 such that the gaskets 60 are in contact with the bottom side 74 of the frame 24 within the gasket cavities 98. As depicted in FIG. 10, the various dimensions of the gaskets 60 and the gasket cavities 98 described above and shown in the previous Figures are chosen, in one embodiment, such that the gasket 60 is also in contact with opposing inner edges 112 of the gasket cavities 98. That is, the outer diameter 62 (shown in FIG. 4) of the gaskets 60 may be substantially the same as widths 102 (shown in FIG. 9) of the gasket cavities 98. Additionally, the inner diameter 68 (shown in FIG. 4) of the gasket openings 66 may be substantially the same as the width 88 (shown in FIG. 9) of the first LED openings 76. Also, the height 64 (shown in FIG. 4) of the gaskets 60 may be greater than the depth 104 (shown in FIG. 9) of the gasket cavities 98 such that the gaskets 60 extend beyond the bottom side 74 of the frame 24. It should be noted that in at least one embodiment, the gaskets 60 are in direct contact with the frame 24. That is, no adhesive material is deposited between the gaskets 60 and the frame 24. It should also be noted that the positioning of the gaskets 60 is such that each of the gaskets 36 is held between the frame 24 and the substrate 36 and extends around a periphery of (or surrounds or circumscribes) a respective one of the first LEDs 38, as well as the associated first LED opening 76. As such, each of the gaskets 60 may be considered to have a first portion 111 and a second portion 113 that are on opposing sides of the respective first LED 38 and the associated first LED opening 76, as shown in FIG. 10.

Still referring to FIG. 10, the placement of the frame 24 also causes, in one embodiment, the first LEDs 38 to at least partially extend into the first LED openings 76 and the second LEDs 40 to extend into the second LED cavities 100, with the lens 52 of the second LEDs 40 extending through the second LED openings 78.

Figure 11:
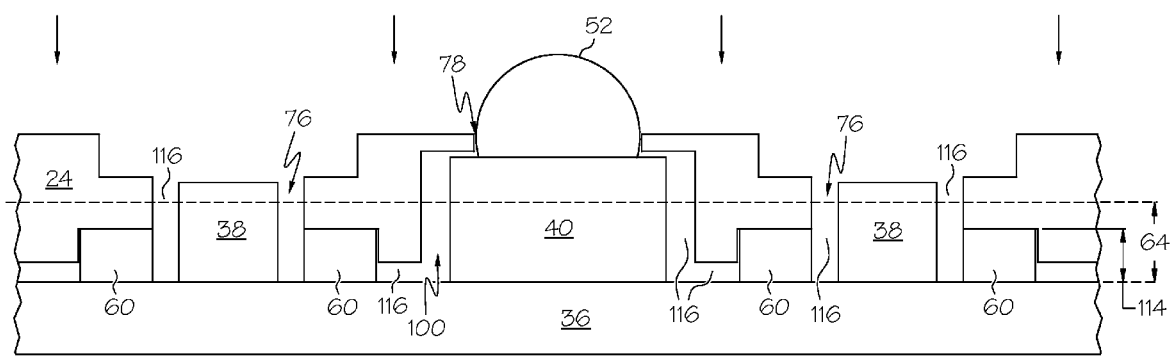
FIG. 11 is a cross-sectional side view of the backlight frame and the PCB of FIG. 10 illustrating the backlight frame being secured to the PCB.

FIG. 11 illustrates the frame 24 being secured to the substrate 36. As illustrated, a force is applied on the frame 24 towards the substrate 36 (and/or vice versa) such that the gaskets 60 are "squeezed" or compressed such that the heights thereof are reduced to a second, compressed height 114 that is less than the first, uncompressed height 64 (shown in FIGS. 4 and 10). In one embodiment, the second height 114 of the gaskets 60 is approximately 0.020 inches less than the first height 64. The compression of the gaskets 60 causes the first LEDs 38 to extend farther into the first LED openings 76, the second LEDs 40 to extend farther into the second LED cavities 100, and the lens to protrude a greater extent through the second LED openings 78. As shown, the various dimensions of the first and second LEDs 38 and 40, the first LED openings 76, and the second LED cavities 100, as described above, may be chosen such that air gaps 116 are formed therebetween to account for manufacturing tolerances, as will be appreciated by one skilled in the art. In the depicted embodiment, the air gaps 116 between the second LEDs 40 and the frame 24 extend to between the frame 24 and the substrate 36, as the compressed height 114 of the gaskets 60 is greater than the depth 104 of the gasket cavities 98. Although not shown in detail, the frame 24 is then secured to the substrate 36 (e.g., via fasteners such as screws or bolts) in the position shown in FIG. 11 such that the gaskets 60 remain compressed and in contact with the frame 24 and the substrate 36.

Although not specifically shown, it should be understood that the material of which the gaskets 60 are made may have a "memory," as is commonly understood, such that if the frame 24 is removed from the substrate 36, the height of the gaskets 60 may increase to greater than the compressed height 114. In one embodiment, the memory of the gasket 60 material causes, if the frame 24 is removed from the substrate 36, the height of the gaskets 60 to increase to a height between the compressed height 114 and the uncompressed height 64 (shown in FIG. 4).

Figure 12:
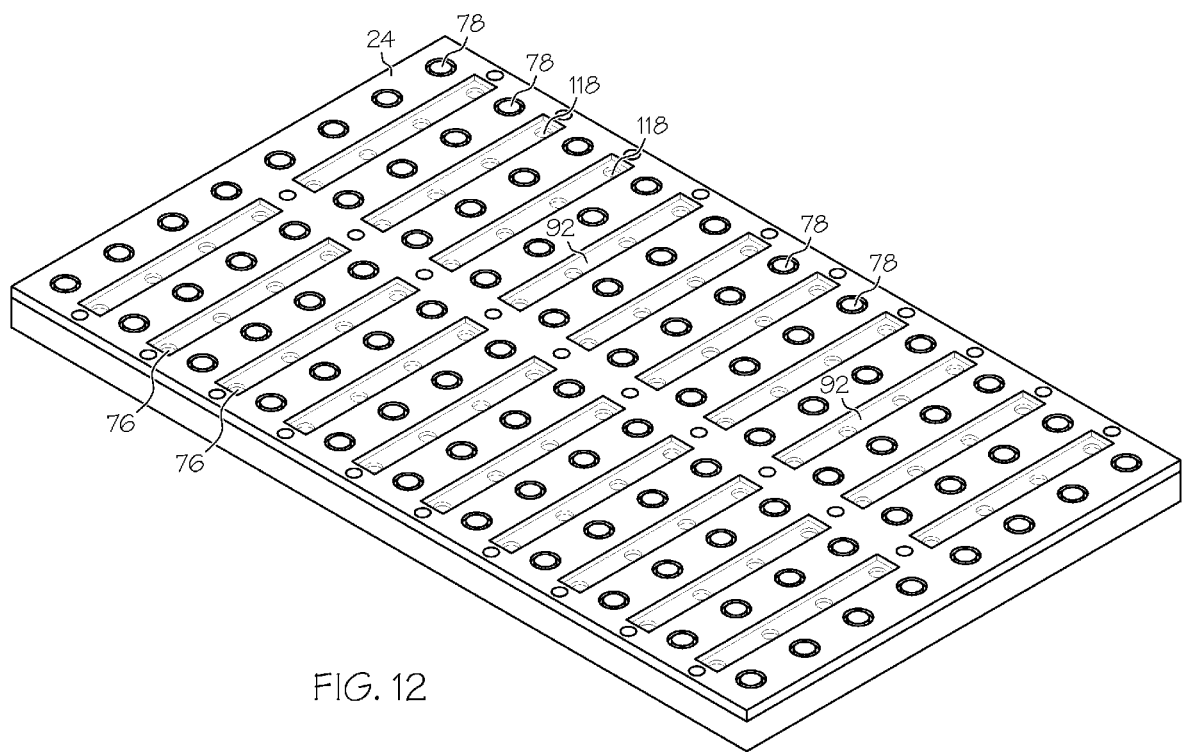
FIG. 12 is an isometric view of the backlight frame and the PCB of FIG. 11 with a plurality of optical filters positioned on the top side of the backlight frame.
Figure 13:
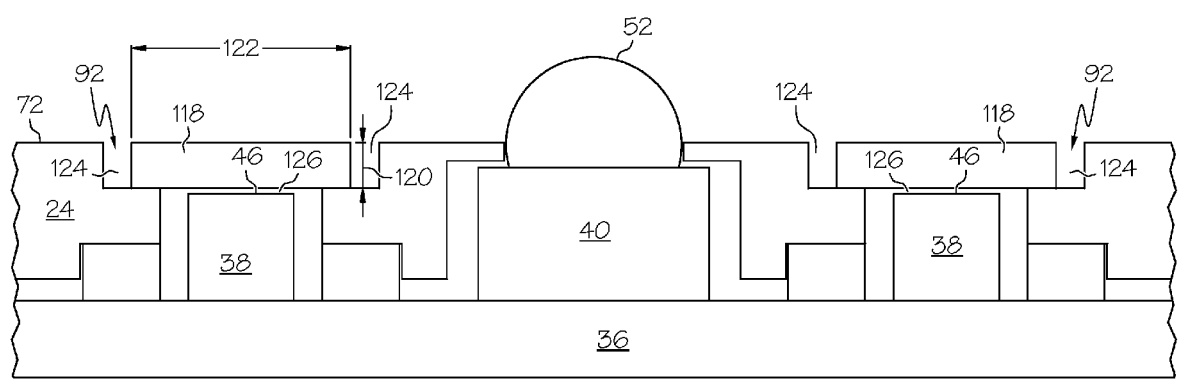
FIG. 13 is a cross-sectional side view of the backlight frame and the PCB of FIG. 12.

Referring to FIGS. 12 and 13, optical filters 118 are then placed within the optical filter cavities 92 on the top side 72 of the frame 70. The optical filters 118, in the depicted embodiment, have a rectangular shape and a depth 120 similar to (or slightly less than) that of the optical filter cavities 92 (i.e., depth 96 shown in FIG. 9). The optical filters 118 have a width 122 that is less than the width 94 of the optical filter cavities 92 (FIG. 9). As such, a gap (or gaps) 124 (i.e., to account for manufacturing tolerances) remain between the outer edges of the optical filters 118 and the opposing inner edges of the optical filter cavities 92. Additionally, light mixing gaps 126 may remain between the bottom side of the optical filters 118 and the top sides 46 of the first LEDs 38. As shown in FIG. 12, each optical filter 118 covers the four first LED openings 76 in the frame 24 within its respective optical filter cavity 92. As will be appreciated by one skilled in the art, the optical filters 118 may be made of glass and substantially filter or block selected frequencies of light emitted by the first LEDs 38. In one embodiment, the optical filters 118 are Night Vision Imaging System (NVIS) optical filters that substantially filter or block substantially all infrared and/or near-infrared light.

Figure 14:
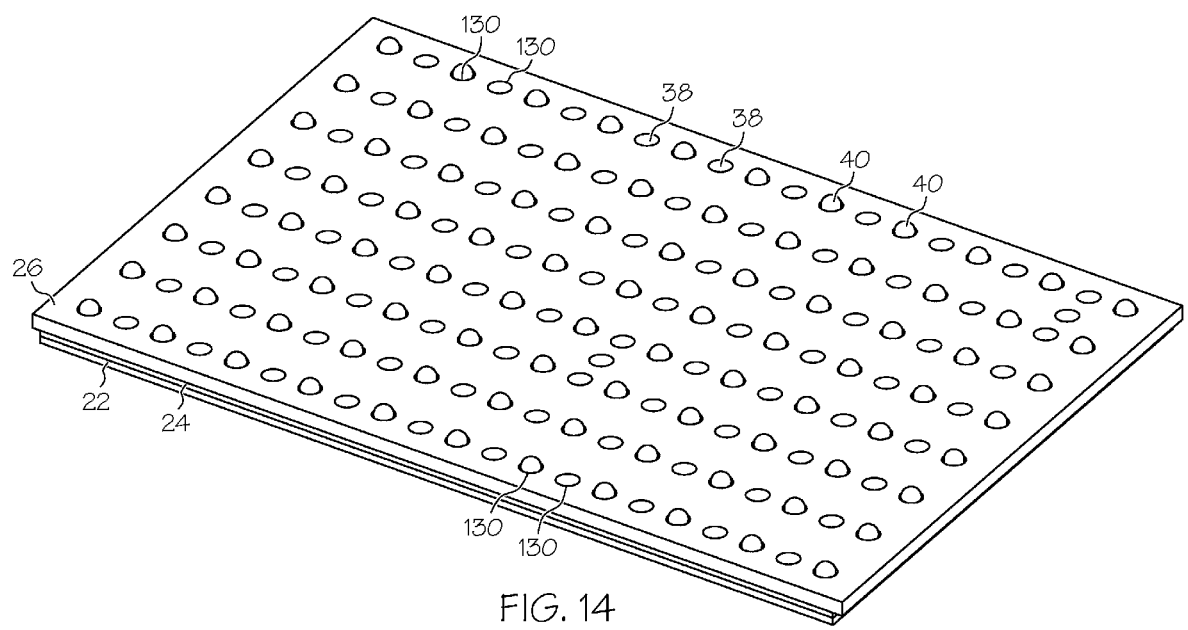
FIG. 14 is an isometric view of the backlight frame and the PCB of FIG. 13 after a reflective layer has been placed over the top side of the backlight frame.
Figure 15:
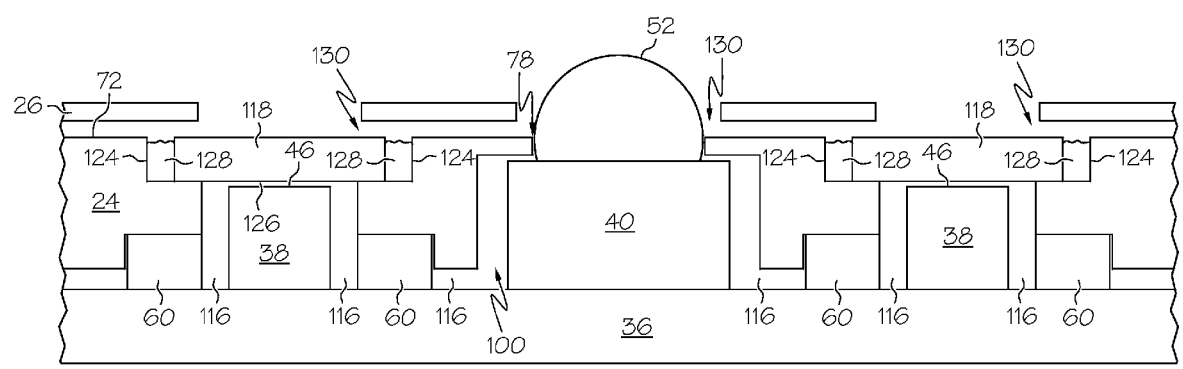
FIG. 15 is a cross-sectional side view of the backlight frame and the PCB of FIG. 14.

As illustrated in FIGS. 14 and 15, the optical filters 118 are then secured to the frame 24 and the reflective layer 26 is positioned over the top side 72 of the frame. Referring specifically to FIG. 15, in one embodiment, the optical filters 118 are secured to the frame 24 by depositing an adhesive 128 into the gaps 124 between the outer edges of the optical filters 118 and the inner edges of the optical filter cavities. The adhesive 128 may substantially block (or be opaque to) the transmission of all light, or at least the selected frequencies of light (e.g., infrared and/or near-infrared). In one embodiment, the adhesive 128 is a Room Temperature Vulcanizing (RTV) adhesive, as is commonly understood. The reflective layer 26 includes a plurality of apertures 130 therethough, each positioned over a respective one of the first and second LEDs 38 and 40. As shown specifically in FIG. 15, each of the lenses 52 of the second LEDs 40 extends upwards through the respective aperture 130 that is positioned above it. Although not specifically illustrated, the reflective layer 26 may be secured to the frame 24 using an adhesive material deposited on a side thereof adjacent to the frame 24.

Figure 16:
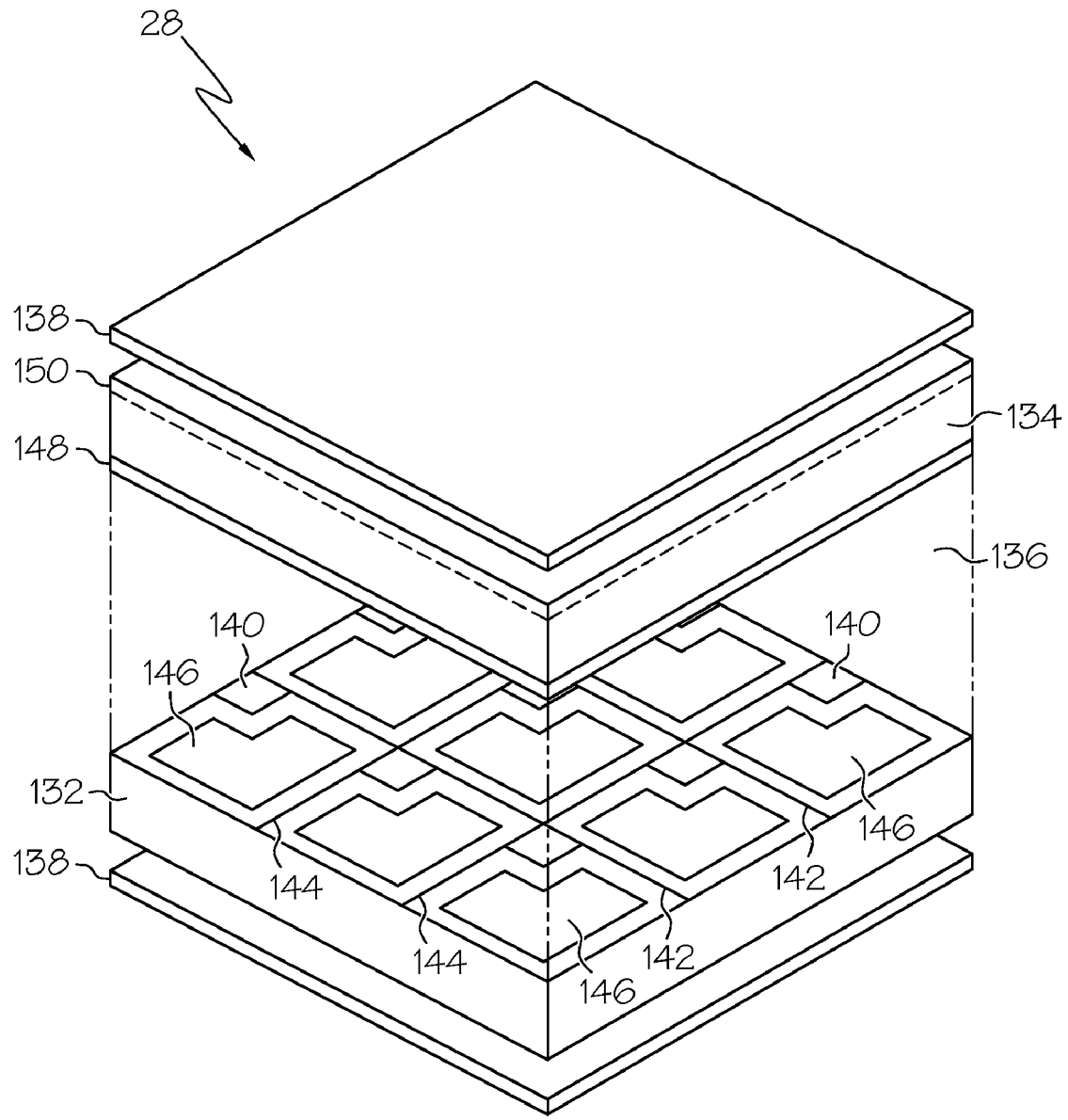
FIG. 16 is a cross-sectional isometric view of a portion of an liquid crystal display panel within the flat panel display system of FIG. 1.

Referring again to FIG. 1, the LCD panel 28 is then positioned over the reflective layer 26. FIG. 16 illustrates a portion of the LCD panel 28 according to one embodiment of the present invention. The LCD panel 28 is, in one embodiment, a thin film transistor (TFT) LCD panel and includes a lower substrate 132, an upper substrate 134, a liquid crystal layer 136, and polarizers 138. As will be appreciated by one skilled in the art, the lower substrate 132 may be made of glass and have a plurality of TFT transistors 140 formed thereon, including a plurality of gate electrodes 142 (i.e., row lines), including a plurality of rows of electrodes, and source electrodes 144 (i.e., column lines), including a plurality of columns of electrodes, interconnecting respective rows and columns of the transistors 140. The gate and source electrodes 142 and 144 divide the lower substrate 132 into a plurality of pixels 146, as is commonly understood. The upper substrate 134 may also be made of glass and include a common electrode 148 at a lower portion thereof and a color filter layer 150 at an upper portion thereof. The common electrode 148 may substantially extend across the upper substrate 134. The liquid crystal layer 136 may be positioned between the lower substrate 132 and the upper substrate 134 and include a liquid crystal material suitable for use in a LCD display. As shown, the LCD panel 28 includes two polarizers 138, with one being positioned below the lower substrate 132 and one above the upper substrate 134. Although not illustrated, the polarizers 138 may be oriented such that respective polarization angles thereof are substantially perpendicular.

Referring again to FIGS. 14 and 15, during operation, in a first (e.g., daytime) mode of operation, the second LEDs 40 (or the second LEDs 40 in conjunction with the first LEDs 38) are operated to emit light into the LCD panel 28 (FIG. 1). As will be appreciated by one skilled in the art, if the first mode of operation is utilized during the daytime, it is often advantageous to have the LEDs 38 and 40 provide as much luminance as possible, regardless of the frequencies of the light emitted from the LEDs 38 and 40. Thus, in the first mode of operation, the relatively high power, second LEDs 40 are used. As no optical filters are positioned over the second LEDs 40, all of the light (i.e., all frequencies of light) propagates from the lenses 52 and into the LCD panel 28. If the first LEDs 38 are also used during the first mode of operation, the operation thereof takes place as described below.

Referring to FIG. 16, a voltage is applied across each pixel 146 that dictates the amount of movement, or twisting, exhibited by the liquid crystals located above in the liquid crystal layer 136 to control the amount of light which passes through the LCD panel 28. As such, the LCD panel 28 modulates the light passing therethrough in such a way that information (e.g., in the form of text, symbols, and figures) is displayed to a user.

Referring again to FIGS. 14 and 15, during a second mode (e.g., nighttime) of operation, the second LEDs 40 are disabled, and only the first LEDs 38 are operated. Light is emitted from the top sides 46 of the first LEDs 38 into the light mixing gaps 126. As will be appreciated by one skilled in the art, the light mixing gaps 126 provide the light emitted from the first LEDs 38 free space in which to propagate and allow for some color mixing to occur.

As the light from the first LEDs 38 impinges the optical filters 118, a first portion of the light is transmitted through the optical filters 118 and a second portion of the light is reflected back towards the first LEDs 38. As the first portion of the light passes through the optical filters 118, the particular frequencies of light (e.g., infrared and/or near-infrared) are filtered or blocked such that the light that continues through the apertures 130 of the reflective layer 26 does not contain any light of the particular frequencies. The filtered light then passes through the LCD panel 28, which forms an image therefrom as described above.

In one embodiment, the flat panel display system 20 is part of a NVIS system in which the user is equipped with a NVIS headset or goggles that are especially sensitive to infrared and/or near-infrared frequencies of light. Because the filtered light passing through the optical filters 118 does not contain include infrared and/or near infrared frequencies of light, the user's vision is not impaired by any infrared and/or near infrared light.

Still referring to FIG. 15, the compression of the gaskets 60, as described above, causes a "seal" to be formed around the first LEDs 38. In particular, the compression of the gaskets 60 reduces the amount and size of any air gaps between the gaskets 60 and the frame 24 and/or the substrate 36. Additionally, because the gaskets 60 are in direct contact with the frame 24 and the substrate 36 (i.e., no adhesive material is deposited between the gaskets 60 and the frame 24 and/or the substrate 36) the likelihood of any optical path (i.e., a passageway through which light may propagate) interconnecting the air gaps 116 adjacent to the first and second LEDs 38 and 40 along the interfaces between the gaskets 60 and the frame 24 and/or the substrate 36 is reduced. As such, the likelihood that any of the unfiltered, second portion of light from the first LEDs 38, which is reflected by the optical filters 118, will propagate into the second LED cavity 100, through the second LED openings 78 and the appropriate apertures 130, and into the LCD panel 28 (FIG. 1) is greatly reduced.

Furthermore, because of the opaque adhesive 128 deposited within the gaps 124 between the optical filters 118 and the frame 24, the likelihood of any optical path interconnecting the color mixing gaps 126 and/or the air gaps 116 adjacent to the first LEDs 38 and the gaps 124 between the optical filters 118 and the frame is reduced. As such, the likelihood that any of the unfiltered, second portion of the light from the first LEDs 38 will propagate between the optical filters 118 and the frame 24, through the appropriate apertures 130, and into the LCD panel 28 (FIG. 1) is greatly reduced.

Thus, one advantage of the system and method described above is that because of the compression of the gaskets, as well as the lack of adhesive between the gaskets and the frame and/or the substrate, which reduces the likelihood that any unfiltered light will obscure the user's vision during the second mode of operation, the overall performance of the system is improved. Additionally, because the likelihood of any unfiltered light reaching the user is even further decreased due to the opaque adhesive around the optical filters, the overall performance of the system is even further improved. Another advantage is that because no adhesive is used to secure the gaskets, the time required to assemble the system is minimized.

Other embodiments may utilize different numbers of sets of LEDs. For example, the PCB may include only a single type of LED with every LED having a filtering apparatus (e.g., an optical filter). The numbers and arrangements of the LEDs may be varied, as may the sizes and shapes of the various openings and cavities on the frame, as well as those of the gaskets (e.g., they could be circular, oval, square, rectangular, etc. and still perform the exact same function.) Additionally, other filtering configurations may be used such as optical filters which are relatively small so that each only covers a single LED, or any other number of LEDs, rather than the example described above in which each optical filter covers four NVIS mode LEDs. Furthermore, the optical filters could be made of materials other than glass with thin film coatings as shown herein, such as a glass absorptive filter or a plastic filter of any type. Also, although the example shown and described above is what could be considered to be an RGB LCD in a "stripe" configuration, it should be understood that other types of LCDs may also be used, such as monochrome LCD displays (e.g., a monochrome indicator unit or a heads up display (HUD).

Figure 17:
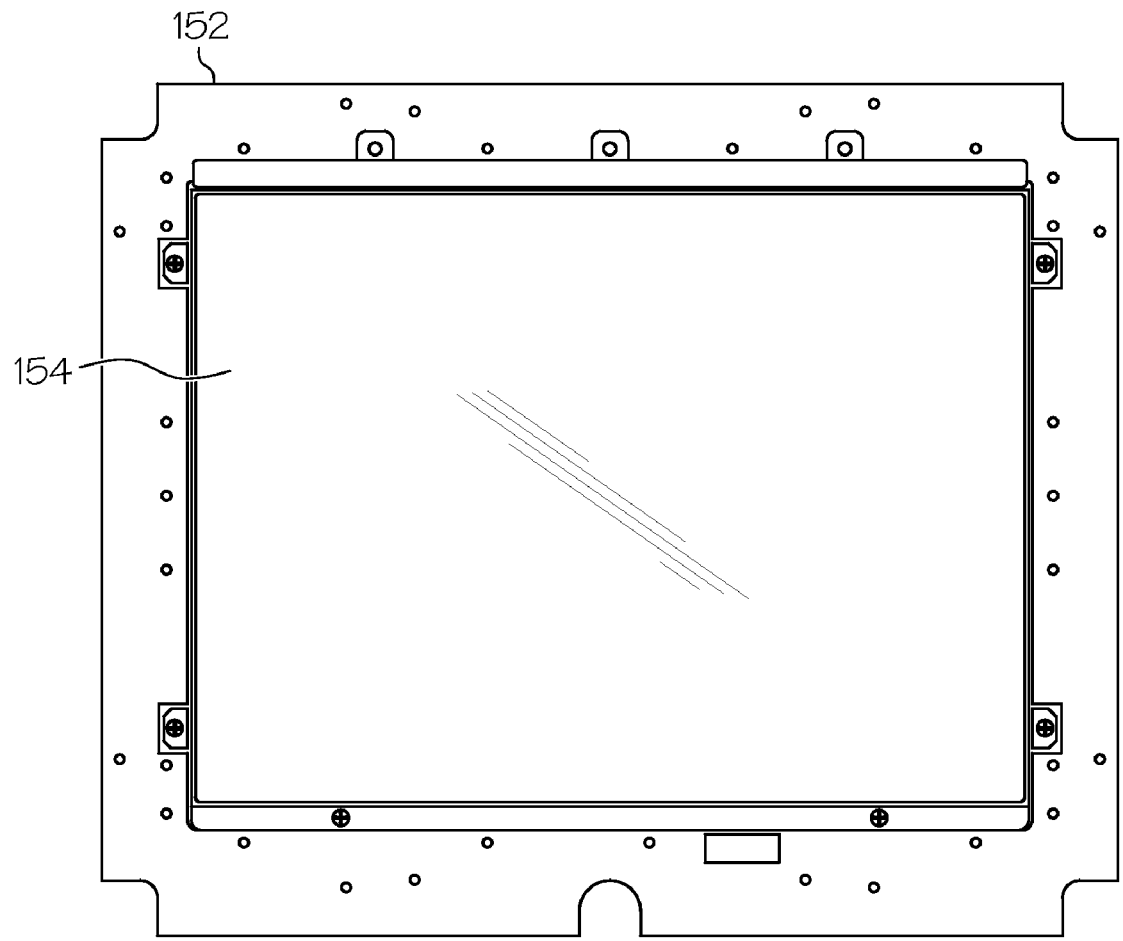
FIG. 17 is a top plan view of a flat panel display system housing.
Figure 18:
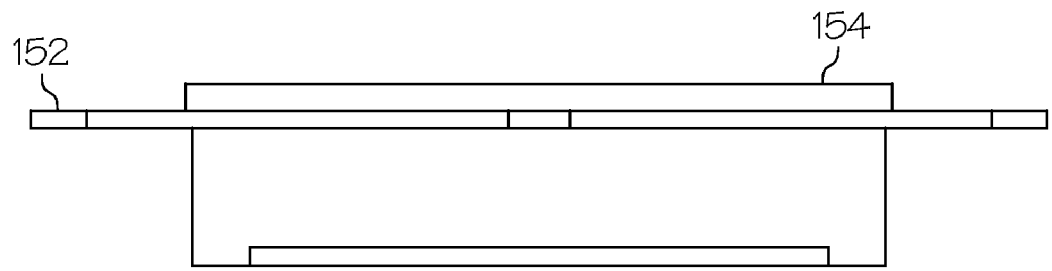
FIG. 18 is a side view of the flat panel display system housing of FIG. 17.

FIGS. 17 and 18 illustrate a housing 152 into which the flat panel display system 20 (FIG. 1) may be fitted. Although not specifically shown, the housing 152 has a cavity therein that is approximately the same size and shape as the flat panel display system 20 (FIG. 1), wherein the flat panel display system 20 may be housed. The housing 152 includes a viewing screen 154 through which the LCD panel 28 may be viewed by the user.

Figure 19:
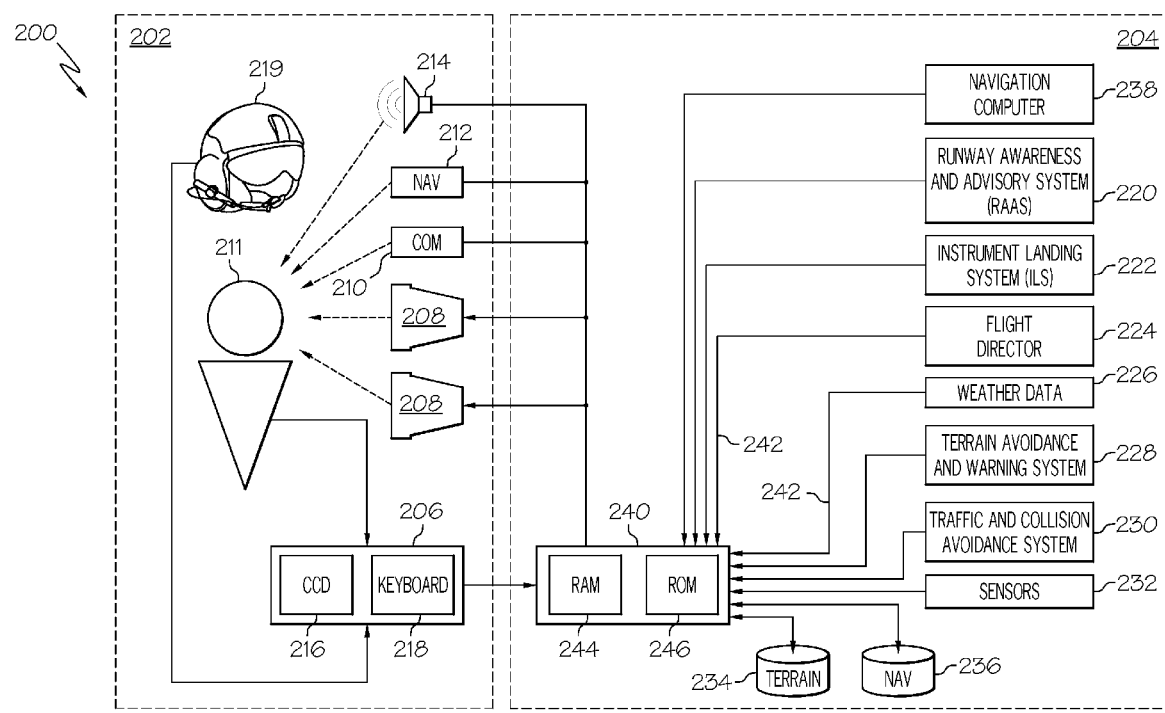
FIG. 19 is a block diagram schematically illustrating a vehicle including a flight deck and an avionics/flight system in which the flat panel display system of FIG. 1 may be implemented.

FIG. 19 schematically illustrates a vehicle 200, such as an aircraft, in which the flat panel display system 20 (FIG. 1) described above may be implemented, according to one embodiment of the present invention. The vehicle 200 may be, in one embodiment, any one of a number of different types of aircraft such as, for example, a private propeller or jet engine driven airplane, a commercial jet liner, or a helicopter. In the depicted embodiment, the vehicle 200 includes a flight deck 202 (or cockpit) and an avionics/flight system 204. Although not specifically illustrated, it should be understood that the vehicle 200 also includes a frame or body to which the flight deck 202 and the avionics/flight system 204 are connected, as is commonly understood. It should also be noted that vehicle 200 is merely exemplary and could be implemented without one or more of the depicted components, systems, and data sources. It will additionally be appreciated that the vehicle 200 could be implemented with one or more additional components, systems, or data sources. Additionally, is should be understood that the system 20 may be utilized in vehicles other than aircraft, such as manned ground vehicles with a closed cockpits (e.g. tank or armored personnel carrier) or an open vehicles such as a Humvee class vehicle. Further, the system 20 may be used in portable computing devices such as laptop computers and other similar mobile devices with LCD displays.

The flight deck 202 includes a user interface 206, at least one display device 208 (e.g., a primary flight display (PFD), a communications radio 210, a navigational radio 212, and an audio device 214. The user interface 206 is configured to receive input from the user 211 (e.g., the pilot) and, in response to the user input, supply command signals to the avionics/flight system 204. The user interface 206 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 206 includes a CCD 216 and a keyboard 218 and has a NVIS headset/helmet and/or goggles 219 coupled thereto. The user 211 uses the CCD 216 to, among other things, move a cursor symbol on the display devices 208, and may use the keyboard 218 to, among other things, input textual data.

Still referring to FIG. 1, the display devices 208, which may include the flat panel display system described above, are used to display various images and data, in graphic, iconic, and/or textual formats, and to supply visual feedback to the user 211 in response to user input commands supplied by the user 211 to the user interface 206.

The communication radio 210 is used, as is commonly understood, to communicate with entities outside the vehicle 200, such as air-traffic controllers and pilots of other aircraft. The navigational radio 212 is used to receive from outside sources and communicate to the user various types of information regarding the location of the vehicle, such as Global Positioning Satellite (GPS) system and Automatic Direction Finder (ADF) (as described below). The audio device 214 is, in one embodiment, an audio speaker mounted within the flight deck 202.

The avionics/flight system 204 includes a runway awareness and advisory system (RAAS) 220, an instrument landing system (ILS) 222, a flight director 224, a weather data source 226, a terrain avoidance warning system (TAWS) 228, a traffic and collision avoidance system (TCAS) 230, a plurality of sensors 232, one or more terrain databases 234, one or more navigation databases 236, a navigation and control system 238, and a processor 240. The various components of the avionics/flight system 204 are in operable communication via a data bus 242 (or avionics bus).

The RAAS 220 provides improved situational awareness to help lower the probability of runway incursions by providing timely aural advisories to the flight crew during taxi, takeoff, final approach, landing and rollout. The ILS 222 is a radio navigation system that provides aircraft with horizontal and vertical guidance just before and during landing and, at certain fixed points, indicates the distance to the reference point of landing. The flight director 224, as is generally known, supplies command data representative of commands for piloting the aircraft in response to flight crew entered data, or various inertial and avionics data received from external systems. The weather data source 226 provides data representative of at least the location and type of various weather cells. The TAWS 228 supplies data representative of the location of terrain that may be a threat to the aircraft, and the TCAS 230 supplies data representative of other aircraft in the vicinity, which may include, for example, speed, direction, altitude, and altitude trend. Although not illustrated, the sensors 232 may include, for example, a barometric pressure sensor, a thermometer, and a wind speed sensor.

The terrain databases 234 include various types of data representative of the terrain over which the aircraft may fly, and the navigation databases 236 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information.

Although not illustrated, the navigation and control system 238 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear). The processor 240 may be any one of numerous known general-purpose microprocessors or an application specific processor that operates in response to program instructions. In the depicted embodiment, the processor 240 includes on-board RAM (random access memory) 244 and on-board ROM (read only memory) 246. The program instructions that control the processor 240 may be stored in either or both the RAM 244 and the ROM 246. For example, the operating system software may be stored in the ROM 246, whereas various operating mode software routines and various operational parameters may be stored in the RAM 244. It will be appreciated that this is merely exemplary of one scheme for storing operating system software and software routines, and that various other storage schemes may be implemented. It will also be appreciated that the processor 240 may be implemented using various other circuits, not just a programmable processor. For example, digital logic circuits and analog signal processing circuits could also be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for constructing a light source for a display device comprising:
   providing a first member having first and second sides and a first plurality of openings and a second plurality of openings therethrough;
   positioning a plurality of seals on the first side of the first member such that first and second portions of each of the seals are on respective opposing sides of a respective one of the first plurality of openings, the plurality of seals having a first thickness;
   positioning a second member on the first side of the first member such that the plurality of seals are between the first and second members;
   positioning a first plurality of light emitting diode (LEDs) operable to emit light at least partially between the first and second members such that each of the first plurality of LEDs is at least partially between the first and second portions of a respective one of the seals and the light emitted therefrom is directed through the respective first opening;
   positioning a second plurality of LEDs operable to emit light at least partially between the first and second members such that none of the second plurality of LEDs is at least partially between the first and second portions of one of the seals and the light emitted therefrom is directed through a respective one of the second plurality of openings; and
   securing the first member relative to the second member, said securing causing a force to be applied to the plurality of seals such that the thickness of the seals is reduced to a second thickness and substantially no light can propagate between each of the plurality of seals and the first and second members, wherein each seal circumscribes each of only the first plurality of LEDs and none of the seals circumscribe any of the second plurality of LEDs.

2. The method of claim 1, wherein each of the first plurality of LEDs is operable to emit light along an axis and is positioned such that the axis extends through the respective first opening.

3. The method of claim 2, wherein the plurality of seals are adjacent to the first member and the second member and no adhesive is deposited between at least one of the first member and the plurality of seals and the second member and the plurality of seals.

4. The method of claim 1, wherein the first plurality of LEDs are of a first type of LED, and the second plurality of LEDs are of a second type of LED.

5. The method of claim 4, wherein the first plurality of LEDs have a first power consumption rating, and the second plurality of LEDs have a second power consumption rating, the second power consumption rating being greater than the first power consumption rating.

6. The method of claim 5, further comprising securing at least one optical filter relative to the first member such that the light emitted from at least some of the first plurality of LEDs is directed through the at least one optical filter, the at least one optical filter being configured to reflect selected frequencies of light.

7. The method of claim 6, wherein the first plurality of LEDs and the second plurality of LEDs are configured to emit the selected frequencies of light.

8. The method of claim 7, wherein the at least one optical filter is configured such that the selected frequencies of light emitted from the first plurality of LEDs are reflected by the at least one optical filter, and the at least one optical filter is arranged such that none of the light emitted from the second plurality of LEDs is directed through the at least one optical filter.

9. The method of claim 8, further comprising depositing an adhesive between the at least one optical filter and the frame, the adhesive being opaque to the selected frequencies of light such that substantially no light of the selected frequencies can propagate between the at least one optical filter and the frame.

10. The method of claim 9, wherein the first member is a frame and the second member is a printed wiring board, the first and second pluralities of LEDs being connected to the wiring board.

11. A method for constructing a backlight for a display device comprising:
    providing a printed circuit board (PCB) having a first plurality of LEDs and a second plurality of LEDs attached to a first side thereof, the first and second pluralities of LEDs being operable to emit selected frequencies of light;

positioning a plurality of sealing members on the first side of the PCB, each sealing member circumscribes of only the first plurality of LEDs and none of the sealing members circumscribes any of the second plurality of LEDs;

providing a frame having first and second sides and a plurality of openings therethrough;

securing the PCB relative to the frame such that the sealing members are positioned between the PCB and the frame and each of the first and second pluralities of LEDs is at least partially positioned within one of the openings, said securing causing a force to be applied to the sealing members by the PCB and the frame such that the thickness of the sealing members is reduced to a second thickness and substantially no light can propagate between the sealing members and the frame and between the sealing members and the PCB; and securing at least one optical filter to the frame, the at least one optical filter being configured to reflect the selected frequencies of light, the at least one optical filter being arranged such that at least some of the light emitted from the first plurality of LEDs is directed through the at least one optical filter and none of the light emitted from the second plurality of LEDs is directed through the at least one optical filter.

12. The method of claim 11, further comprising depositing an adhesive between the at least one optical filter and the frame, the adhesive being opaque to the selected frequencies of light.

13. The method of claim 12, wherein the frame further comprises at least one optical filter cavity having a filter cavity width on the second side thereof, the openings being located within the at least one optical filter cavity, the at least one optical filter has a optical filter width that is less than the cavity width such, and said securing of the at least one optical filter comprises positioning the at least one optical filter within the at least one optical filter cavity such that a gap is formed between outer edges of the at least one optical filter and outer edges of the at least one optical filter cavity, the adhesive being deposited within the gap.

14. The method of claim 13, wherein the positioning of the plurality of sealing members comprises placing a respective sealing member around each of the first plurality of LEDs.

15. A backlight for a display device comprising:

a frame having a plurality of openings therethrough;

a light emitting diode (LED) wiring board having a first plurality of LEDs and a second plurality of LEDs attached thereto and secured relative to the wiring board such that light emitted from each of the first and second pluralities of LEDs is directed through one of the plurality of openings, the first and second pluralities of LEDs being configured to emit selected frequencies of light;

a plurality of sealing members positioned between the frame and the wiring board, each of the sealing members circumscribing each of the openings and one of only the first plurality of LEDs and none of the sealing members circumscribes any of the second plurality of LEDs, a force being applied to the sealing members by the frame and the wiring board such that substantially no light can propagate between the sealing members and the frame and between the sealing members and the wiring board; and a plurality of optical filters secured to the frame such that the light emitted from at least some of the first plurality of LEDs is directed therethrough and none of the light emitted from the second plurality of LEDs is directed therethrough, the plurality of optical filters being configured to reflect the selected frequencies of light.

16. The backlight of claim 15, wherein there is no adhesive between the sealing members and the frame and between the sealing members and the wiring board.

17. The backlight of claim 15, further comprising an adhesive deposited between the optical filters and the frame, the adhesive being opaque to selected frequencies of light.

18. The backlight of claim 17, wherein the frame further comprises a plurality of optical filter cavities having a filter cavity width on the second side thereof, each of the openings being located within one of the plurality of optical filter cavities, the optical filters have a optical filter width that is less than the filter cavity width, and the optical filters are positioned within the optical filter cavities such that a gap is formed between outer edges of the optical filters and outer edges of the optical filter cavities, the adhesive being deposited within the gap.

* * * * *